US011734389B2

(12) United States Patent
Lv et al.

(10) Patent No.: US 11,734,389 B2
(45) Date of Patent: Aug. 22, 2023

(54) METHOD FOR GENERATING HUMAN-COMPUTER INTERACTIVE ABSTRACT IMAGE

(71) Applicant: Sichuan University, Chengdu (CN)

(72) Inventors: Jiancheng Lv, Chengdu (CN); Youcheng Huang, Chengdu (CN); Mao Li, Chengdu (CN); Chenwei Tang, Chengdu (CN); Quanhui Liu, Chengdu (CN)

(73) Assignee: Sichuan University, Chengdu (CN)

( * ) Notice: Subject to any disclaimer, the term of this patent is extended or adjusted under 35 U.S.C. 154(b) by 285 days.

(21) Appl. No.: 17/239,696

(22) Filed: Apr. 26, 2021

(65) Prior Publication Data

US 2022/0180120 A1 Jun. 9, 2022

(30) Foreign Application Priority Data

Dec. 7, 2020 (CN) .......................... 202011417498.3

(51) Int. Cl.
*G06F 18/2132* (2023.01)
*G06V 10/44* (2022.01)
(Continued)

(52) U.S. Cl.
CPC ........ *G06F 18/2132* (2023.01); *G06F 18/214* (2023.01); *G06N 3/045* (2023.01); *G06N 3/08* (2013.01); *G06V 10/44* (2022.01)

(58) Field of Classification Search
CPC .... G06F 18/2132; G06F 18/214; G06F 18/28; G06F 3/04883; G06N 3/045; G06N 3/08; G06N 3/048; G06N 3/047; G06N 3/088; G06N 3/04; G06N 20/00; G06N 3/084; G06N 20/10; G06N 20/20; G06V 10/44; G06V 10/82; G06V 10/764; G06V 10/454; G06V 10/774; G06V 20/10; G06V 20/20; G06V 20/70; G06V 30/19147; G06V 30/19173; G06V 30/333; G06T 11/00; G06T 2207/20084; G06T 2207/20081;
(Continued)

(56) References Cited

U.S. PATENT DOCUMENTS

10,997,752 B1 * 5/2021 Yoo ...................... G06T 11/001
11,068,746 B2 * 7/2021 Bala ..................... G06V 10/774
(Continued)

*Primary Examiner* — Michael S Osinski
(74) *Attorney, Agent, or Firm* — Bayramoglu Law Offices LLC (57) ABSTRACT

A method for generating a human-computer interactive abstract image includes: S1: obtaining and preprocessing the original abstract images used as a training dataset B to obtain edge shape feature maps used as a training dataset A; S2: using the training dataset A and the training dataset B as cycle generative objects of a Cycle-GAN model, and training the Cycle-GAN model to capture a mapping relationship between the edge shape feature maps and the original abstract images; S3: obtaining a line shape image drawn by a user; and S4: according to the mapping relationship, intercepting a generative part in the Cycle-GAN model that the dataset B is generated from the dataset A, discarding a cycle generative part and a discrimination part in the Cycle-GAN model, and generating a complete abstract image based on the line shape image to generate the human-computer interactive abstract image.

10 Claims, 4 Drawing Sheets

(51) Int. Cl.
  *G06N 3/08* (2023.01)
  *G06F 18/214* (2023.01)
  *G06N 3/045* (2023.01)

(58) Field of Classification Search
  CPC ..... G06T 11/203; G06T 7/13; G06T 2200/24;
  G06T 2207/20221; G06T 2207/30201;
  G06T 5/50
  See application file for complete search history.

(56) References Cited

U.S. PATENT DOCUMENTS

| | | | |
|---|---|---|---|
| 11,468,206 B2 * | 10/2022 | Yeh | G06N 3/088 |
| 2018/0060701 A1 * | 3/2018 | Krishnamurthy | G06V 10/454 |
| 2018/0247201 A1 * | 8/2018 | Liu | G06T 1/00 |
| 2019/0251401 A1 * | 8/2019 | Shechtman | G06V 10/82 |
| 2020/0097709 A1 * | 3/2020 | Huang | G06F 18/214 |
| 2020/0342306 A1 * | 10/2020 | Giovannini | G06N 3/08 |
| 2020/0364910 A1 * | 11/2020 | Price | G06T 7/40 |
| 2021/0064858 A1 * | 3/2021 | Batra | G06N 3/08 |
| 2021/0141825 A1 * | 5/2021 | Su | G06F 16/90335 |
| 2021/0174072 A1 * | 6/2021 | Zhang | G06V 40/165 |
| 2021/0248799 A1 * | 8/2021 | Rodgers | G06F 3/04845 |
| 2021/0295483 A1 * | 9/2021 | Huang | G06T 11/00 |
| 2021/0303925 A1 * | 9/2021 | Hofmann | G06V 20/56 |
| 2021/0358170 A1 * | 11/2021 | Eisenmann | G06T 7/13 |
| 2022/0156522 A1 * | 5/2022 | Shechtman | G06F 18/214 |
| 2022/0164097 A1 * | 5/2022 | Tadros | G06F 3/0488 |
| 2022/0180120 A1 * | 6/2022 | Lv | G06N 3/047 |
| 2022/0180490 A1 * | 6/2022 | Jo | G06N 3/08 |
| 2022/0189136 A1 * | 6/2022 | Wang | G06V 10/44 |
| 2023/0065433 A1 * | 3/2023 | Li | G06V 10/40 |
| 2023/0076457 A1 * | 3/2023 | Gao | G06N 3/04 |
| 2023/0100255 A1 * | 3/2023 | Gooding | G06T 7/13 382/128 |

* cited by examiner

METHOD FOR GENERATING HUMAN-COMPUTER INTERACTIVE ABSTRACT IMAGE

CROSS REFERENCE TO THE RELATED APPLICATIONS

This application is based upon and claims priority to Chinese Patent Application No. 202011417498.3, filed on Dec. 7, 2020, the entire contents of which are incorporated herein by reference.

TECHNICAL FIELD

The present invention relates to the technical field of image generation, and more particularly, to a method for generating a human-computer interactive abstract image.

BACKGROUND

Figure 1:
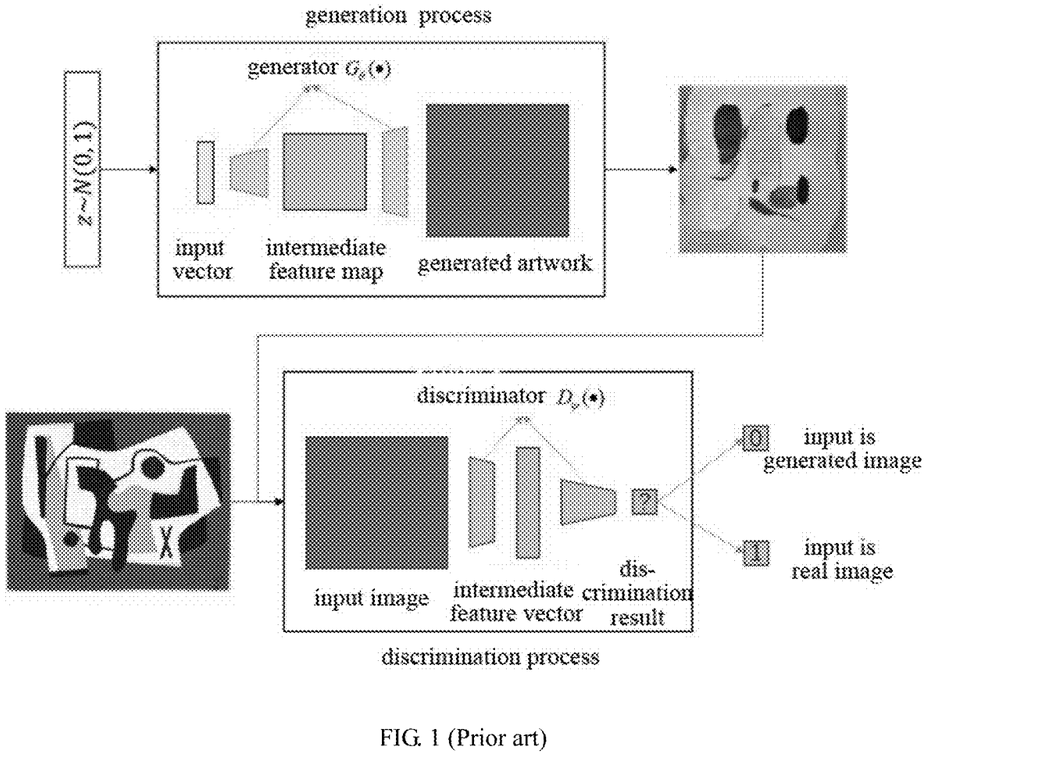
FIG. 1 is a schematic diagram of a traditional approach in the prior art.

As deep learning advances, the use of a generative adversarial network (GAN) enables artificial intelligence (AI) to apply to the field of image generation. In contrast to traditional image processing approaches based on manual feature analysis, the deep learning enables computers to adaptively analyze latent features of given data. This is especially suitable for processing image data whose features are difficult to clearly define and classify, such as artworks. Based on the idea of generative adversarial algorithm, public studies have explored network structures that can be used to generate artworks. As shown in FIG. 1, a generative structure includes a generator $G_\theta(\cdot)$ and a discriminator $D_\phi(\cdot)$. Noise z conforming to a Gaussian distribution is input into the generator $G_\theta(e)$ to obtain a generated artistic image $G_\theta(z)$, and then the artistic image $G_\theta(z)$ is mixed with a real artistic image $X_{real}$ to form a mixed image set. An image randomly selected from the mixed image set is input into the discriminator to obtain a classification $D_\phi(x)$ of the image (discriminating whether the image is the generated artistic image). If the discriminator, which is often regarded as a powerful discriminating expert, cannot distinguish whether the given image is a generated one or a real artistic one, then the purpose can be achieved that the generator is enabled to generate fake artistic images that look like real.

The prior AI artistic creation framework is a so-called "end-to-end" process, namely, randomly inputting a vector that conforms to the Gaussian distribution to directly obtain a finished artwork. Abstract images, however, are a creation manner that expresses natural things subjectively through shapes and colors. An abstract image includes three important components: shape, color, and an idea of reflecting the creators' subjective thinking. The traditional "end-to-end" creation process of human-computer separation generates artistic images only relying on Gaussian vectors generated by a system, which cannot reflect the creators' subjective thinking, thereby failing to satisfy the constructing components of abstract images. Thus, it is not suitable for generating abstract images. Besides, there is no accurate evaluation criteria in the "end-to-end" artistic creation.

With respect to the images that are obtained only through Gaussian vectors, the qualities of the images can only be determined from a completely subjective perspective of whether they look like artworks. Finally, the other two components of abstract images are shape and color. The traditional artistic creation manner regards abstract images as a whole to be generated, without highlighting the shape and color components. Moreover, compared with other realistic simulated artworks, changes in the shape and color components of abstract images are relatively rich and irregular. Thus, treating abstract images as a whole to be generated is not conducive to neural networks to learn the latent features of abstract images, thereby leading to problems such as a long training process, an uncontrollable training result, and non-convergence of a loss function.

SUMMARY

In view of the above-mentioned shortcomings in the prior art, the present invention provides a method for generating a human-computer interactive abstract image, which can solve the problem in the prior art that generated abstract images cannot reflect a creators' subjective thinking, fails to display the constructing components of abstract images, and is hard to train in the traditional approach.

In order to achieve the above object, the present invention adopts the following technical solution.

A method for generating a human-computer interactive abstract image includes:

S1: obtaining original abstract images, and preprocessing the original abstract images to obtain edge shape feature maps in one-to-one correspondence with the original abstract images; wherein the edge shape feature maps are used as a training dataset A, and the original abstract images are used as a training dataset B;

S2: using the training dataset A and the training dataset B as cycle generative objects of a Cycle-generative adversarial network (GAN) model, and training the Cycle-GAN model to capture a mapping relationship between the edge shape feature maps and the original abstract images;

S3: obtaining a line shape image drawn by a user; and

S4: according to the mapping relationship, intercepting a generative part in the Cycle-GAN model that the dataset B is generated from the dataset A, discarding a cycle generative part and a discrimination part in the Cycle-GAN model, and generating a complete abstract image based on the line shape image to generate the human-computer interactive abstract image.

Further, step S1 includes:

S101: obtaining the original abstract images, and using the original abstract images to construct the dataset B;

S102: performing a binarization processing on the original abstract images in the dataset B, and extracting color edge information in binarized images to obtain the edge shape feature maps in one-to-one correspondence with the original abstract images; and

S103: calculating lengths of the edge shape feature maps, and discarding edge lines with a length being greater than 150 pixels to obtain the dataset A.

Further, the Cycle-GAN model in step S2 includes a first generator G and a second generator F having an identical structure, and a first discriminator $D_G$ and a second discriminator $D_F$ having an identical structure.

The first generator G is configured to capture the mapping relationship between the edge shape feature maps and the original abstract images.

The second generator F is configured to capture an inverse mapping relationship between the edge shape feature maps and the original abstract images.

The first discriminator $D_G$ is configured to discriminate a generative quality of the first generator G.

The second discriminator $D_F$ is configured to discriminate a generative quality of the second generator F.

Further, each of the first discriminator $D_G$ and the second discriminator $D_F$ includes a first convolutional layer, a second convolutional layer, a third convolutional layer, a fourth convolutional layer and a fifth convolutional layer, which are successively connected. Each of the first convolutional layer, the second convolutional layer, the third convolutional layer and the fourth convolutional layer is provided with a normalization operation and a rectified linear unit (ReLU) function. The fifth convolutional layer is provided with a Sigmoid function.

Each of the first generator G and the second generator F includes an encoding module, a residual module and a decoding module, which are successively connected.

Further, the number of convolutional kernels of the first convolutional layer is 64, a size of the convolutional kernels of the first convolutional layer is 4×4, and a stride of the first convolutional layer is 2.

The number of convolutional kernels of the second convolutional layer is 128, a size of the convolutional kernels of the second convolutional layer is 4×4, and a stride of the second convolutional layer is 2.

The number of convolutional kernels of the third convolutional layer is 256, a size of the convolutional kernels of the third convolutional layer is 4×4, and a stride of the third convolutional layer is 2.

The number of convolutional kernels of the fourth convolutional layer is 512, a size of the convolutional kernels of the fourth convolutional layer is 4×4, and a stride of the fourth convolutional layer is 2.

The number of convolutional kernel of the fifth convolutional layer is 1, a size of the convolutional kernel of the fifth convolutional layer is 4×4, and a stride of the fifth convolutional layer is 1.

Further, the encoding module includes a sixth convolutional layer, a seventh convolutional layer and an eighth convolutional layer, which are successively connected.

Each of the sixth convolutional layer, the seventh convolutional layer and the eighth convolutional layer is provided with a normalization operation and a ReLU activation function.

The residual module includes a first residual layer, a second residual layer, a third residual layer, a fourth residual layer, a fifth residual layer and a sixth residual layer, which are successively connected. Each of the first residual layer, the second residual layer, the third residual layer, the fourth residual layer, the fifth residual layer and the sixth residual layer is provided with a normalization operation and a ReLU activation function.

The decoding module includes a first decoding layer, a second decoding layer and a third decoding layer, which are successively connected. Each of the first decoding layer and the second decoding layer is provided with a normalization layer and a ReLU activation function. The third decoding layer is provided with a Tanh function.

The eighth convolutional layer is connected to the first residual layer, and the sixth residual layer is connected to the first decoding layer.

Further, the number of convolutional kernels of the sixth convolutional layer is 32, a size of the convolutional kernels of the sixth convolutional layer is 7×7, and a stride of the sixth convolutional layer is 1.

The number of convolutional kernels of the seventh convolutional layer is 64, a size of the convolutional kernels of the seventh convolutional layer is 3×3, and a stride of the seventh convolutional layer is 2.

The number of convolutional kernels of the eighth convolutional layer is 128, a size of the convolutional kernels of the eighth convolutional layer is 3×3, and a stride of the eighth convolutional layer is 2.

Each of the first residual layer, the second residual layer, the third residual layer, the fourth residual layer, the fifth residual layer and the sixth residual layer includes two convolutional layers. The number of convolutional kernels of each of the two convolutional layers is 128, a size of the convolutional kernels of each of the two convolutional layers is 3×3, and a stride of each of the two convolutional layers is 1.

The number of convolutional kernels of the first decoding layer is 64, a size of the convolutional kernels of the first decoding layer is 3×3, and a stride of the first decoding layer is 2.

The number of convolutional kernels of the second decoding layer is 32, a size of the convolutional kernels of the second decoding layer is 3×3, and a stride of the second decoding layer is 2.

The number of convolutional kernels of the third decoding layer is 3, a size of the convolutional kernels of the third decoding layer is 7×7, and a stride of the third decoding layer is 1.

Further, step S2 includes:

S201: randomly selecting a shape line image x from the dataset A as an input of the first generator G, and obtaining a complete abstract image ŷ corresponding to the shape line image by the first generator G;

S202: using a real abstract image y in the dataset B as a positive sample, using the complete abstract image ŷ as a negative sample, and inputting the positive sample and the negative sample into the first discriminator $D_G$ to obtain an adversarial loss value of the first discriminator $D_G$;

S203: using the complete abstract image ŷ as an input of the second generator F, obtaining a line shape image x̂ corresponding to the complete abstract image by the second generator F, and calculating a first cycle loss value according to the line shape image x̂ and the shape line image x;

S204: randomly selecting the real abstract image y from the dataset B as an input of the second generator F, and obtaining a shape line image x̂ corresponding to the complete real image y by the second generator F;

S205: using the shape line image x in the dataset A as a positive sample, using the shape line image x̂ obtained in step S204 as a negative sample, and inputting the positive sample and the negative sample into the second discriminator $D_F$ to obtain an adversarial loss value of the second discriminator $D_F$;

S206: using the shape line image x̂ obtained in step S204 as an input of the first generator G, obtaining a complete abstract image ŷ by the first generator G, and calculating a second cycle loss value according to the complete abstract image ŷ and the real abstract image y; and S207: minimizing the adversarial loss value of the first discriminator $D_G$, the adversarial loss value of the second discriminator $D_F$, the first cycle loss value and the second cycle loss value by using an optimizer to complete training the Cycle-GAN model to capture the mapping relationship between the edge shape feature maps and the original abstract images.

Further, the adversarial loss value of the first discriminator $D_G$ is expressed as follows:

$$L_{GAN}(G, D_G) = \min_{\Theta G}\max_{\Theta D_G}\{E_y[(\log D_G(y)] + E_x[\log(1 - D_G(G(x))]\},$$

wherein, $L_{GAN}(G,D_G)$ represents the adversarial loss value of the first discriminator $D_G$; ΘG represents a parameter of the first generator G; $\Theta D_G$ represents a parameter of the first discriminator $D_G$; $D_G(y)$ represents an output obtained by the first discriminator $D_G$ on the real abstract image y; $E_y$ represents an average over all real abstract images y; G(x) represents an output of the first generator G for the shape line image x; $D_G(G(x))$ represents an output obtained by the first discriminator $D_G$ on a generated sample G(x); and $E_x$ represents an average over all shape line images x.

The adversarial loss value of the second discriminator $D_F$ is expressed as follows:

$$L_{GAN}(F, D_F) = \min_{\Theta F}\max_{\Theta D_F}\{E_x[(\log D_F(x)] + E_y[\log(1 - D_F(F(y))]\},$$

wherein, $L_{GAN}(F,D_F)$ represents the adversarial loss value of the second discriminator $D_F$; $\Theta F$ represents a parameter of the second generator F; $\Theta D_F$ represents a parameter of the second discriminator $D_F$; $D_F(y)$ represents an output obtained by the second discriminator $D_F$ on the real abstract image y; $E_y$ represents the average over all real abstract images y; F(x) represents an output of the second generator F for the shape line image x; $D_F(F(x))$ represents an output obtained by the second discriminator $D_F$ on the generated sample G(x); and $E_x$ represents the average over all shape line images x.

Further, a cycle loss function of the first generator G and the second generator F in step S205 is expressed as follows:

$$L_{cyc}(D,F)=\|F(G(x))-x\|_1+\|G(F(y))-y\|_1,$$

wherein, $L_{cyc}(D,F)$ represents the cycle loss function of the first generator G and the second generator F; F(G(x)) represents the line shape image corresponding to the complete abstract image obtained by the second generator F; x represents the shape line image in the dataset A; G(F(y)) represents the complete abstract image obtained by the first generator G; y represents the real abstract image in the dataset B.

The present invention has the following advantages.

(1) The present invention receives simple line shape images drawn by users as inputs for generating abstract images, so that users' subjective descriptions of objective things are used to generate abstract images by the present invention. As opposed to the traditional approach, which uses computer-generated vectors conforming to the Gaussian distribution as inputs for generating artworks, the present invention provides a human-computer interactive creation approach suitable for creating abstract artworks. Besides, since the method provided in the present invention takes shape and color as different components of an identical abstract image to a large extent, during a creation process, color AI creation is mainly focused on, while recreation is performed on shape structures only based on users' inputs. This makes the difficulty of training of the generative model of the present invention lower than that of the traditional approach. Further, in terms of evaluation mechanism, the present invention provides creators with clearer evaluation criteria, including three dimensions of shape, color, and idea of reflecting users' subjective thinking. Based on the criteria, users can more objectively describe the qualities of generated images.

(2) Different from the traditional approach, the present invention realizes the separation of the shape and color components of the abstract images. Besides, the key point enabling the generated artwork to reflect users' subjective thinking in the human-computer interactive creation is to extract shape features of the artwork from the data of the abstract image by the edge feature extracting operator, thereby establishing a matching relationship between the shape and the color of the abstract image.

(3) The present invention provides a method for generating a human-computer interactive abstract image based on a Cycle-GAN. Simple line shape images drawn by users are input, and corresponding finished abstract images are generated.

DETAILED DESCRIPTION OF THE EMBODIMENTS

The specific embodiments of the present invention are described below to facilitate those skilled in the art to understand the present invention. However, it should be noted that the present invention is not limited to the scope of the specific embodiments. For those skilled in the art, as long as various changes are within the spirit and scope of the present invention defined and discriminated by the appended claims, these changes are obvious, and all solutions that are made taking advantage of the present invention shall fall within the scope of protection of the present invention.

Embodiment

Figure 2:
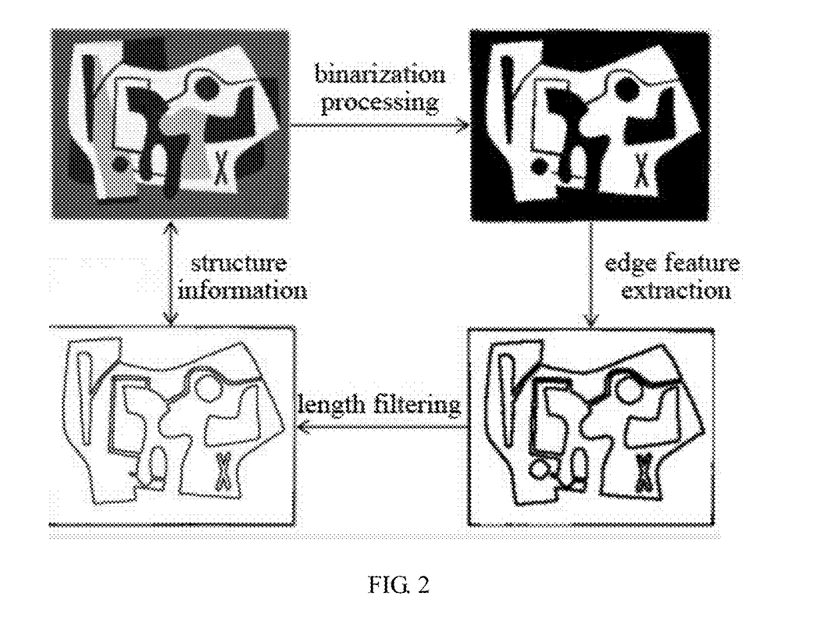
FIG. 2 is a schematic diagram of edge features of the abstract image shape component extraction in an embodiment.
Figure 3:
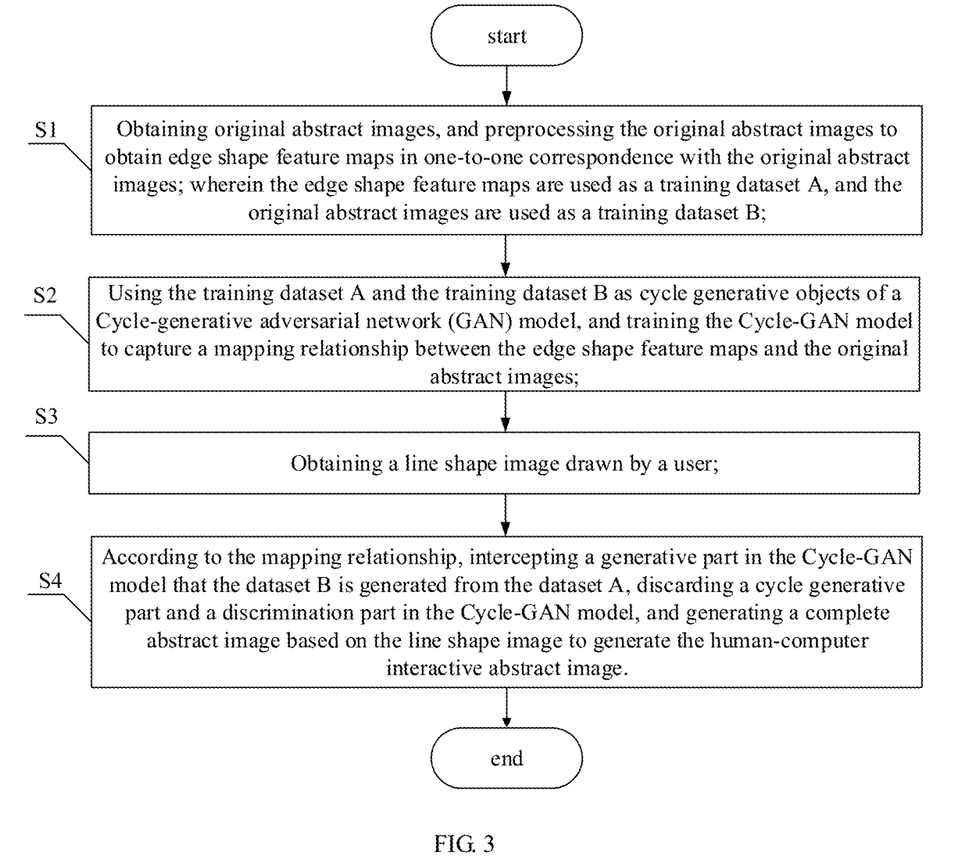
FIG. 3 is a flow chart of the method of the present invention.

The present invention provides a method for generating a human-computer interactive abstract image based on an edge feature extracting operator and a Cycle-GAN. The present invention allows users to first observe an objective thing and draw a simple line shape that is related to the objective thing but is created subjectively. The present invention receives the shape lines drawn by users, and, on this basis, performs recreation on the shape and complete AI creation on colors, and finally outputs an artwork of an abstract image that contains a shape, a color and an idea capable of reflecting the users' subjective thinking. As shown in FIG. 2, different from the traditional approach, the present invention realizes the separation of the shape and color components of the abstract images. Besides, the key point enabling the generated artwork to reflect the users' subjective thinking in the human-computer interactive creation is to extract shape features of the artwork from the data of the abstract image by the edge feature extracting operator, thereby establishing a matching relationship between the shape and the color of the abstract image. As shown in FIG. 3, in an embodiment, the method provided in the present invention includes the following steps.

S1: original abstract images are obtained, and the original abstract images are preprocessed to obtain edge shape feature maps in one-to-one correspondence with the original abstract images. The edge shape feature maps are used as the training dataset A, and the original abstract images are used as the training dataset B.

In an embodiment, step S1 includes:

S101: the original abstract images are obtained, and the original abstract images are used to construct the dataset B;

S102: binarization processing is performed on the original abstract images in the dataset B, and color edge information in binarized images is extracted to obtain the edge shape feature maps in one-to-one correspondence with the original abstract images; and S103: lengths of the edge shape feature maps are calculated, and edge lines with a length being greater than 150 pixels are discarded to obtain the dataset A.

In an embodiment, the present invention selects abstract images from WiKiArt and other related websites. A total of 4415 images are used to construct the dataset B of the original abstract images for training. The OpenCV2 image processing tool is used to process each of the original abstract images in the dataset B. First, binarization processing is performed on the images using a threshold function, where a binarization threshold is an average of colors of a current image. Then, the color edge information in the binarized images is extracted by using a findContours function. However, since not all changes in the colors indicate meaningful shape structures, there is a need to limit the length of extracted edge information. The present invention calculates the length of each edge line by using an arcLength function, and sets a length discarding threshold to be 150 pixels, so as to obtain the training dataset A with the same amount of elements as the dataset B.

S2: the training dataset A and the training dataset B are used as cycle generative objects of a Cycle-GAN model, and the Cycle-GAN model is trained to capture a mapping relationship between the edge shape feature maps and the original abstract images.

Figure 4:
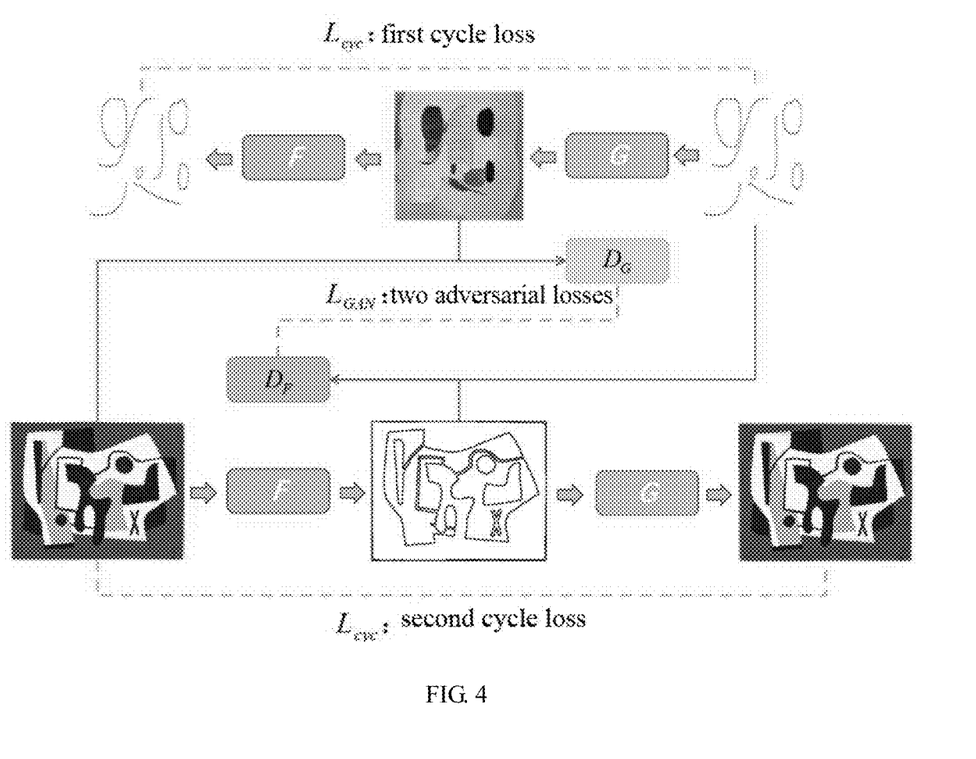
FIG. 4 is a schematic diagram of an overall structure of a Cycle-GAN according to the present invention.

In an embodiment, step S2 includes:

S201: a shape line image x is randomly selected from the dataset A as an input of the first generator G, and a complete abstract image $\hat{y}$ corresponding to the shape line image is obtained by the first generator G;

S202: a real abstract image y in the dataset B is used as a positive sample, the complete abstract image $\hat{y}$ is used as a negative sample, and the positive sample and the negative sample are input into the first discriminator $D_G$ to obtain an adversarial loss value of the first discriminator $D_G$;

S203: the complete abstract image $\hat{y}$ is used as an input of the second generator F, a line shape image $\hat{x}$ corresponding to the complete abstract image is obtained by the second generator F, and a first cycle loss value is calculated according to the line shape image $\hat{x}$ and the shape line image x;

S204: the real abstract image y is randomly selected from the dataset B as an input of the second generator F, and a shape line image $\hat{x}$ corresponding to the real abstract image y is obtained by the second generator F;

S205: the shape line image x in the dataset A is used as a positive sample, the shape line image $\hat{x}$ obtained in step S204 is used as a negative sample, and the positive sample and the negative sample are input into the second discriminator $D_F$ to obtain an adversarial loss value of the second discriminator $D_F$;

S206: the shape line image $\hat{x}$ obtained in step S204 is used as an input of the first generator G, a complete abstract image $\hat{y}$ is obtained by the first generator G, and a second cycle loss value is calculated according to the complete abstract image $\hat{y}$ and the real abstract image y; and S207: the adversarial loss value of the first discriminator $D_G$, the adversarial loss value of the second discriminator $D_F$, the first cycle loss value and the second cycle loss value are minimized by using an optimizer to complete training the Cycle-GAN model to capture the mapping relationship between the edge shape feature maps and the original abstract images.

In an embodiment, the adversarial loss value of the first discriminator $D_G$ is expressed as follows:

$$L_{GAN}(G, D_G) = \min_{\Theta G}\max_{\Theta D_G}\{E_y[(\log D_G(y)] + E_x[\log(1 - D_G(G(x))]\},$$

where, $L_{GAN}(G,D_G)$ represents the adversarial loss value of the first discriminator $D_G$; $\Theta G$ represents a parameter of the first generator G; $\Theta D_G$ represents a parameter of the first discriminator $D_G$; $D_G(y)$ represents an output obtained by the first discriminator $D_G$ on the real abstract image y; $E_y$ represents an average over all real abstract images y; G(x) represents an output of the first generator G for the shape line image x; $D_G(G(x))$ represents an output obtained by the first discriminator $D_G$ on a generated sample G(x); and $E_x$ represents an average over all shape line images x.

The adversarial loss value of the second discriminator $D_F$ is expressed as follows:

$$L_{GAN}(F, D_F) = \min_{\Theta F}\max_{\Theta D_F}\{E_x[(\log D_F(x)] + E_y[\log(1 - D_F(F(y))]\},$$

where, $L_{GAN}(F,D_F)$ represents the adversarial loss value of the second discriminator $D_F$; $\Theta F$ represents a parameter of the second generator F; $\Theta D_F$ represents a parameter of the second discriminator $D_F$; $D_F(y)$ represents an output obtained by the second discriminator $D_F$ on the real abstract image y; $E_y$ represents the average over all real abstract images y; F(x) represents an output of the second generator F for the shape line image x; $D_F(F(x))$ represents an output obtained by the second discriminator $D_F$ on the generated sample G(x); and $E_x$ represents the average over all shape line images x.

In an embodiment, with respect to a traditional adversarial loss function, the Cycle-GAN model further introduces a cycle loss function to ensure the cycle consistency of generated images. The cycle loss function of the first generator G and the second generator F is expressed as follows:

$$L_{cyc}(D,F) = \|F(G(x)) - x\|_1 + \|G(F(y)) - y\|_1,$$

where, $L_{cyc}(D,F)$ represents the cycle loss function of the first generator G and the second generator F; F(G(x)) represents the line shape image corresponding to the complete abstract image obtained by the second generator F; x represents the shape line image in the dataset A; G(F(y)) represents the complete abstract image obtained by the first generator G; y represents the real abstract image in the dataset B.

In an embodiment, the cycle loss function ensures that the inverse mapping F can map the complete abstract image generated by the mapping G back to the structural information, and also ensures that the mapping G can map the structural information generated by the inverse mapping F back to the real abstract image, so as to further ensure the reality of the complete abstract image generated by the mapping G.

A loss function of the entire training process is:

$$L = L_{GAN}(G, D_G) + L_{GAN}(F, D_F) + L_{cyc}(G, F)$$

In an embodiment, the present invention uses the Cycle-GAN model to learn the mutual mapping relationship between the dataset A and the dataset B, namely learning the mapping G: A→B from a simple structure to a complete abstract image and the inverse mapping F: B→A from the complete abstract image to the simple structure. Although the present invention does not use the inverse mapping F to generate an abstract image, the inverse mapping F provides a cycle consistency for the Cycle-GAN.

In an embodiment, the mapping G and the inverse mapping F are generators in the Cycle-GAN. The generators (namely the first generator G and the second generator F) are provided with discriminators to supervise the generative qualities of the generators, which are the first discriminator $D_G$ and the second discriminator $D_F$, respectively. Each of the discriminators is a 70×70 PatchGAN discriminator. The overall structure of the Cycle-GAN is shown in FIG. 4. In the Cycle-GAN, the first generator G and the second generator F are codecs and have an identical structure. The details are as follows:

The Cycle-GAN model includes a first generator G and a second generator F having an identical structure, and a first discriminator $D_G$ and a second discriminator $D_F$ having an identical structure. The first generator G is configured to capture a mapping relationship between the edge shape feature maps and the original abstract images. The second generator F is configured to capture an inverse mapping relationship between the edge shape feature maps and the original abstract images. The first discriminator $D_G$ is configured to discriminate a generative quality of the first generator G. The second discriminator $D_F$ is configured to discriminate a generative quality of the second generator F. Each of the first discriminator $D_G$ and the second discriminator $D_F$ includes a first convolutional layer, a second convolutional layer, a third convolutional layer, a fourth convolutional layer and a fifth convolutional layer, which are successively connected. Each of the first convolutional layer, the second convolutional layer, the third convolutional layer and the fourth convolutional layer is provided with a normalization operation and a rectified linear unit (ReLU) function. The fifth convolutional layer is provided with a Sigmoid function. Each of the first generator G and the second generator F includes an encoding module, a residual module and a decoding module, which are successively connected. As shown in Table 1, Table 1 is a table of the structure of the first discriminator $D_G$ and the second discriminator $D_F$. The number of convolutional kernels of the first convolutional layer is 64, the size of the convolutional kernels of the first convolutional layer is 4×4, and the stride of the first convolutional layer is 2. The number of convolutional kernels of the second convolutional layer is 128, the size of the convolutional kernels of the second convolutional layer is 4×4, and the stride of the second convolutional layer is 2. The number of convolutional kernels of the third convolutional layer is 256, the size of the convolutional kernels of the third convolutional layer is 4×4, and the stride of the third convolutional layer is 2. The number of convolutional kernels of the fourth convolutional layer is 512, the size of the convolutional kernels of the fourth convolutional layer is 4×4, and the stride of the fourth convolutional layer is 2. The number of convolutional kernel of the fifth convolutional layer is 1, the size of the convolutional kernel of the fifth convolutional layer is 4×4, and the stride of the fifth convolutional layer is 1. As shown in Table 2, Table 2 is a table of the structure of the first generator G and the second generator F. The encoding module includes a sixth convolutional layer, a seventh convolutional layer and an eighth convolutional layer, which are successively connected. Each of the sixth convolutional layer, the seventh convolutional layer and the eighth convolutional layer is provided with a normalization operation and a ReLU activation function. The residual module includes a first residual layer, a second residual layer, a third residual layer, a fourth residual layer, a fifth residual layer and a sixth residual layer, which are successively connected. Each of the first residual layer, the second residual layer, the third residual layer, the fourth residual layer, the fifth residual layer and the sixth residual layer is provided with a normalization operation and a ReLU activation function. The decoding module includes a first decoding layer, a second decoding layer and a third decoding layer, which are successively connected. Each of the first decoding layer and the second decoding layer is provided with a normalization layer and a ReLU activation function. The third decoding layer is provided with a Tanh function. The eighth convolutional layer is connected to the first residual layer, and the sixth residual layer is connected to the first decoding layer. The number of convolutional kernels of the sixth convolutional layer is 32, the size of the convolutional kernels of the sixth convolutional layer is 7×7, and the stride of the sixth convolutional layer is 1. The number of convolutional kernels of the seventh convolutional layer is 64, the size of the convolutional kernels of the seventh convolutional layer is 3×3, and the stride of the seventh convolutional layer is 2. The number of convolutional kernels of the eighth convolutional layer is 128, the size of the convolutional kernels of the eighth convolutional layer is 3×3, and the stride of the eighth convolutional layer is 2. Each of the first residual layer, the second residual layer, the third residual layer, the fourth residual layer, the fifth residual layer and the sixth residual layer includes two convolutional layers. The number of convolutional kernels of each of the two convolutional layers is 128, the size of the convolutional kernels of each of the two convolutional layers is 3×3, and the stride of each of the two convolutional layers is 1. The number of convolutional kernels of the first decoding layer is 64, the size of the convolutional kernels of the first decoding layer is 3×3, and the stride of the first decoding layer is 2. The number of convolutional kernels of the second decoding layer is 32, the size of the convolutional kernels of the second decoding layer is 3×3, and the stride of the second decoding layer is 2. The number of convolutional kernels of the third decoding layer is 3, the size of the convolutional kernels of the third decoding layer is 7×7, and the stride of the third decoding layer is 1.

TABLE 1

| Name of Convolutional Layer | Number of Convolutional Kernels | Size of Convolutional Kernels | Stride | Output Normalization Operation | Activation Function |
|---|---|---|---|---|---|
| first convolutional layer | 64 | 4 × 4 | 2 | batch normalization | ReLU |
| second convolutional layer | 128 | 4 × 4 | 2 | batch normalization | ReLU |
| third convolutional layer | 256 | 4 × 4 | 2 | batch normalization | ReLU |

TABLE 1-continued

| Name of Convolutional Layer | Number of Convolutional Kernels | Size of Convolutional Kernels | Stride | Output Normalization Operation | Activation Function |
|---|---|---|---|---|---|
| fourth convolutional layer | 512 | 4 × 4 | 2 | batch normalization | ReLU |
| fifth convolutional layer | 1 | 4 × 4 | 1 | | Sigmoid |

TABLE 2

| Module Name | Component Name | Number of Convolutional Kernels | Size of Convolutional Kernels | Stride | Output Normalization Operation | Activation Function |
|---|---|---|---|---|---|---|
| encoding layer | sixth convolutional layer | 32 | 7 × 7 | 1 | single instance normalization | ReLU |
| | seventh convolutional layer | 64 | 3 × 3 | 2 | single instance normalization | ReLU |
| | eighth convolutional layer | 128 | 3 × 3 | 2 | single instance normalization | ReLU |
| residual module | first residual layer | 128 | 3 × 3 | 1 | single instance normalization | ReLU |
| | | 128 | 3 × 3 | 1 | single instance standardization | ReLU |
| | second residual layer | 128 | 3 × 3 | 1 | single instance normalization | ReLU |
| | | 128 | 3 × 3 | 1 | single instance normalization | ReLU |
| | third residual layer | 128 | 3 × 3 | 1 | single instance normalization | ReLU |
| | | 128 | 3 × 3 | 1 | single instance normalization | ReLU |
| | fourth residual layer | 128 | 3 × 3 | 1 | single instance normalization | ReLU |
| | | 128 | 3 × 3 | 1 | single instance normalization | ReLU |
| | fifth residual layer | 128 | 3 × 3 | 1 | single instance normalization | ReLU |
| | | 128 | 3 × 3 | 1 | single instance normalization | ReLU |
| | sixth residual layer | 128 | 3 × 3 | 1 | single instance normalization | ReLU |
| | | 128 | 3 × 3 | 1 | single instance normalization | ReLU |
| decoding module | first decoding layer | 64 | 3 × 3 | 2 | single instance normalization | ReLU |
| | second decoding layer | 32 | 3 × 3 | 2 | single instance normalization | ReLU |
| | third decoding layer | 3 | 7 × 7 | 1 | | Tanh |

S3: a line shape image drawn by a user is obtained.

In an embodiment, drawing panels are provided for users to receive users' actions of drawing lines to then form line shape images. There are various types of such drawing panels. A simple manner is that users use drawing tools of tablet computers to draw image files.

S4: according to the mapping relationship, a generative part in the Cycle-GAN model that the dataset B is generated from the dataset A is intercepted, a cycle generative part and a discrimination part in the Cycle-GAN model are discarded, and a complete abstract image is generated based on the line shape image to generate the human-computer interactive abstract image.

In an embodiment, assuming a generation process a→b→a', where a represents a real shape line image, b represents a generated complete abstract image, and a' represents a generated shape line image, the generative part refers to the part a→b, the cycle generative part refers to the part b→a', and the discrimination part refers to discriminating, by a discriminator, whether b' is generated. During the training process, all the three parts are needed; while after the training, only the part a→b is needed.

In an embodiment, the first generator G and the second generator F are obtained. The present invention involves a process of generating complete abstract images from shape line images, thus the first generator G is selected as the final generative model, receive users' input images at the same time, and outputs corresponding generated abstract images.

In an embodiment, since the present invention is based on line shape images subjectively drawn by users, in addition to relying on the completely subjective criterion of "looks like abstract images", users can also determine the quality of the generated abstract images from the following aspects:

(1) Whether the generated abstract images reflect line shape features input by users. Users' inputs are not only shape features, but also an important basis for abstract images generated by the method according to the present invention to reflect users' subjective thinking. Thus, the generated abstract images need to clearly reflect users' input shapes.

(2) Whether the generated abstract images are recreated on line shapes input by users. Since users are non-professional painters, line shapes input by them may be excessively simple or have insufficient structures. The adversarial loss function of the Cycle-GAN model ensures that the generated abstract images are as consistent as possible with abstract images drawn by professional painters. This means that the present invention needs to perform recreation on the non-professional shape structures input by users to obtain more complete abstract structures.

(3) Whether complete AI color creation is performed on the generated abstract images. The present invention separates a shape and a color of abstract images by the Cycle-GAN model. After users input a basic shape image, the present invention should return a complete abstract image containing both the shape and the color. This means that the computer needs to perform independent and complete AI color creation.

Figure 5:
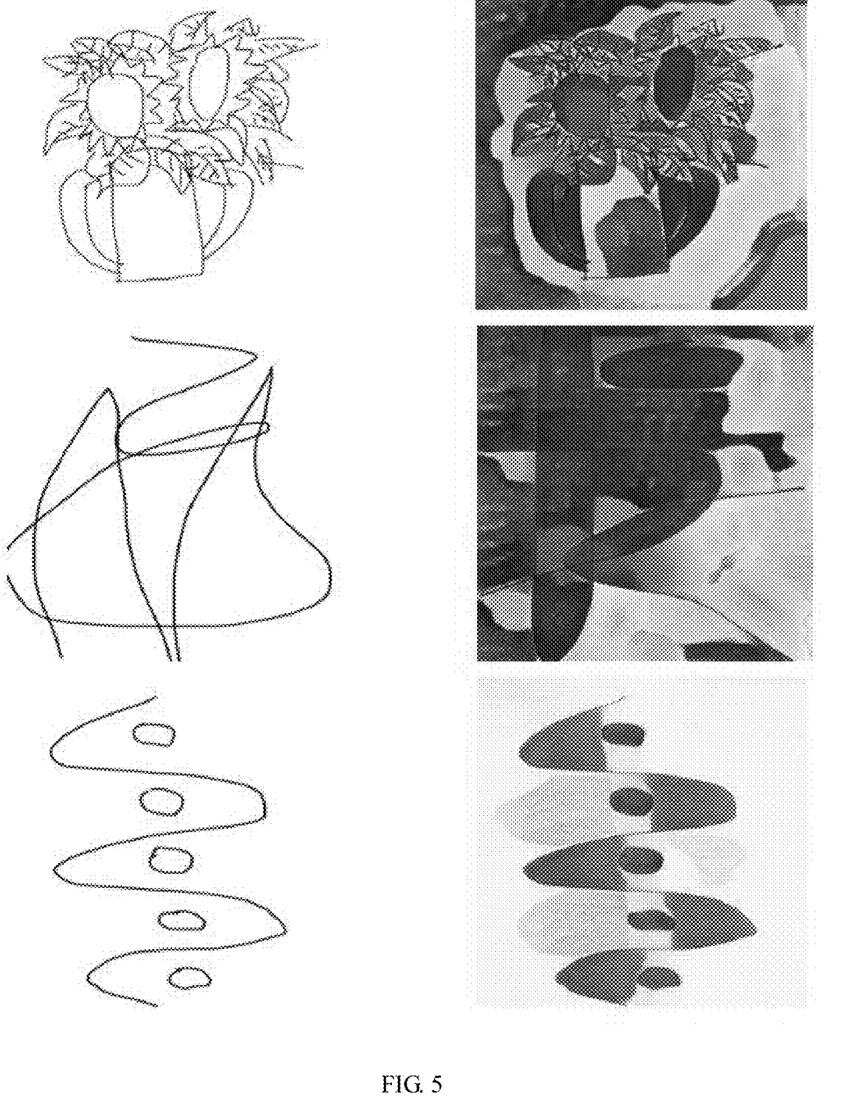
FIG. 5 is a schematic diagram of examples generated according to an embodiment of the present invention.

As shown in FIG. 5, three examples given in FIG. 5 show generated results according to the present invention. In the first group of sunflowers, firstly, the generated result clearly reflects the input shape. Secondly, a shape structure that wraps the lines is formed in addition to the main part of the sunflowers, which performs the recreation on the basis of a given shape. Finally, independent and complete AI creation is made for the colors of the flower petals and flower cores of the sunflowers, as well as the colors of different backgrounds. Besides, the flower cores of the sunflowers using bright red instead of single brown can reflect the abstract artistic expression form.

What is claimed is:

1. A method for generating a human-computer interactive abstract image, comprising the steps of:
   S1: obtaining original abstract images, and preprocessing the original abstract images to obtain edge shape feature maps in one-to-one correspondence with the original abstract images; wherein the edge shape feature maps are used as a training dataset A, and the original abstract images are used as a training dataset B;
   S2: using the training dataset A and the training dataset B as cycle generative objects of a Cycle-generative adversarial network (GAN) model, and training the Cycle-GAN model to capture a mapping relationship between the edge shape feature maps and the original abstract images;
   S3: obtaining a line shape image drawn by a user; and
   S4: according to the mapping relationship, intercepting a generative part in the Cycle-GAN model that the training dataset B is generated from the training dataset A, discarding a cycle generative part and a discrimination part in the Cycle-GAN model, and generating a complete abstract image based on the line shape image to generate the human-computer interactive abstract image.

2. The method according to claim 1, wherein step S1 comprises:
   S101: obtaining the original abstract images, and using the original abstract images to construct the training dataset B;
   S102: performing a binarization processing on the original abstract images in the training dataset B to obtain binarized images, and extracting color edge information in the binarized images to obtain the edge shape feature maps in one-to-one correspondence with the original abstract images; and
   S103: calculating lengths of edge lines of the edge shape feature maps, and discarding edge lines with a length being greater than 150 pixels to obtain the training dataset A.

3. The method according to claim 1, wherein
the Cycle-GAN model in step S2 comprises a first generator G, a second generator F, a first discriminator $D_G$ and a second discriminator $D_F$; wherein the first generator G and the second generator F are identical structurally, and the first discriminator $D_G$ and the second discriminator $D_F$ are identical structurally;
the first generator G is configured to capture the mapping relationship between the edge shape feature maps and the original abstract images;
the second generator F is configured to capture an inverse mapping relationship between the edge shape feature maps and the original abstract images;
the first discriminator $D_G$ is configured to discriminate a generative quality of the first generator G; and
the second discriminator $D_F$ is configured to discriminate a generative quality of the second generator F.

4. The method according to claim 3, wherein
each of the first discriminator $D_G$ and the second discriminator $D_F$ comprises a first convolutional layer, a second convolutional layer, a third convolutional layer, a fourth convolutional layer and a fifth convolutional layer, wherein the first convolutional layer, the second convolutional layer, the third convolutional layer, the fourth convolutional layer and the fifth convolutional layer are successively connected; each of the first convolutional layer, the second convolutional layer, the third convolutional layer and the fourth convolutional layer is provided with a first normalization operation and a rectified linear unit (ReLU) activation function; the fifth convolutional layer is provided with a Sigmoid function; and
each of the first generator G and the second generator F comprises an encoding module, a residual module and a decoding module, wherein the encoding module, the residual module and the decoding module are successively connected.

5. The method according to claim 4, wherein
a number of convolutional kernels of the first convolutional layer is 64, a size of the convolutional kernels of the first convolutional layer is 4×4, and a stride of the first convolutional layer is 2;
a number of convolutional kernels of the second convolutional layer is 128, a size of the convolutional kernels of the second convolutional layer is 4×4, and a stride of the second convolutional layer is 2;
a number of convolutional kernels of the third convolutional layer is 256, a size of the convolutional kernels of the third convolutional layer is 4×4, and a stride of the third convolutional layer is 2;
a number of convolutional kernels of the fourth convolutional layer is 512, a size of the convolutional kernels of the fourth convolutional layer is 4×4, and a stride of the fourth convolutional layer is 2; and
a number of convolutional kernel of the fifth convolutional layer is 1, a size of the convolutional kernel of the fifth convolutional layer is 4×4, and a stride of the fifth convolutional layer is 1.

6. The method according to claim 5, wherein
the encoding module comprises a sixth convolutional layer, a seventh convolutional layer and an eighth convolutional layer, wherein the sixth convolutional layer, the seventh convolutional layer and the eighth convolutional layer are successively connected; each of the sixth convolutional layer, the seventh convolutional layer and the eighth convolutional layer is provided with a second normalization operation and the ReLU activation function;
the residual module comprises a first residual layer, a second residual layer, a third residual layer, a fourth residual layer, a fifth residual layer and a sixth residual layer, wherein the first residual layer, the second residual layer, the third residual layer, the fourth residual layer, the fifth residual layer and the sixth residual layer are successively connected; each of the first residual layer, the second residual layer, the third residual layer, the fourth residual layer, the fifth residual layer and the sixth residual layer is provided with the second normalization operation and the ReLU activation function;

the decoding module comprises a first decoding layer, a second decoding layer and a third decoding layer, wherein the first decoding layer, the second decoding layer and the third decoding layer are successively connected; each of the first decoding layer and the second decoding layer is provided with the second normalization operation and the ReLU activation function; the third decoding layer is provided with a Tanh function; and the eighth convolutional layer is connected to the first residual layer, and the sixth residual layer is connected to the first decoding layer.

7. The method according to claim 6, wherein
a number of convolutional kernels of the sixth convolutional layer is 32, a size of the convolutional kernels of the sixth convolutional layer is 7×7, and a stride of the sixth convolutional layer is 1;

a number of convolutional kernels of the seventh convolutional layer is 64, a size of the convolutional kernels of the seventh convolutional layer is 3×3, and a stride of the seventh convolutional layer is 2;

a number of convolutional kernels of the eighth convolutional layer is 128, a size of the convolutional kernels of the eighth convolutional layer is 3×3, and a stride of the eighth convolutional layer is 2;

each of the first residual layer, the second residual layer, the third residual layer, the fourth residual layer, the fifth residual layer and the sixth residual layer comprises two convolutional layers; a number of convolutional kernels of each of the two convolutional layers is 128, a size of the convolutional kernels of each of the two convolutional layers is 3×3, and a stride of each of the two convolutional layers is 1;

a number of convolutional kernels of the first decoding layer is 64, a size of the convolutional kernels of the first decoding layer is 3×3, and a stride of the first decoding layer is 2;

a number of convolutional kernels of the second decoding layer is 32, a size of the convolutional kernels of the second decoding layer is 3×3, and a stride of the second decoding layer is 2; and a number of convolutional kernels of the third decoding layer is 3, a size of the convolutional kernels of the third decoding layer is 7×7, and a stride of the third decoding layer is 1.

8. The method according to claim 7, wherein step S2 comprises:
S201: randomly selecting a first shape line image x from the training dataset A as a first input of the first generator G, and obtaining a first complete abstract image ŷ corresponding to the first shape line image x by the first generator G;

S202: using a real abstract image y in the training dataset B as a first positive sample, using the first complete abstract image ŷ as a first negative sample, and inputting the first positive sample and the first negative sample into the first discriminator $D_G$ to obtain an adversarial loss value of the first discriminator $D_G$;

S203: using the first complete abstract image ŷ as a first input of the second generator F, obtaining a line shape image x̂ corresponding to the first complete abstract image ŷ by the second generator F, and calculating a first cycle loss value according to the line shape image x̂ and the first shape line image x;

S204: randomly selecting the real abstract image y from the training dataset B as a second input of the second generator F, and obtaining a second shape line image x̂ corresponding to the real abstract image y by the second generator F;

S205: using the first shape line image x in the training dataset A as a second positive sample, using the second shape line image x̂ obtained in step S204 as a second negative sample, and inputting the second positive sample and the second negative sample into the second discriminator $D_F$ to obtain an adversarial loss value of the second discriminator $D_F$;

S206: using the second shape line image x̂ obtained in step S204 as a second input of the first generator G, obtaining a second complete abstract image ŷ by the first generator G, and calculating a second cycle loss value according to the second complete abstract image ŷ and the real abstract image y; and S207: minimizing the adversarial loss value of the first discriminator $D_G$, the adversarial loss value of the second discriminator $D_F$, the first cycle loss value and the second cycle loss value by using an optimizer to complete training the Cycle-GAN model to capture the mapping relationship between the edge shape feature maps and the original abstract images.

9. The method according to claim 8, wherein
the adversarial loss value of the first discriminator $D_G$ is expressed as follows:

$$L_{GAN}(G, D_G) = \min_{\Theta G}\max_{\Theta D_G}\{E_y[(\log D_G(y)] + E_x[\log(1 - D_G(G(x))]\},$$

wherein, $L_{GAN}(G,D_G)$ represents the adversarial loss value of the first discriminator $D_G$; $\Theta G$ represents a parameter of the first generator G; $\Theta D_G$ represents a parameter of the first discriminator $D_G$; $D_G(y)$ represents a first output obtained by the first discriminator $D_G$ on the real abstract image y; $E_y$ represents an average over all real abstract images y; $G(x)$ represents an output of the first generator G for the first shape line image x; $D_G(G(x))$ represents a second output obtained by the first discriminator $D_G$ on a generated sample $G(x)$; and $E_x$ represents an average over all first shape line images x;

the adversarial loss value of the second discriminator $D_F$ is expressed as follows:

$$L_{GAN}(F, D_F) = \min_{\Theta F}\max_{\Theta D_F}\{E_x[(\log D_F(x)] + E_y[\log(1 - D_F(F(y))]\},$$

wherein, $L_{GAN}(F,D_F)$ represents the adversarial loss value of the second discriminator $D_F$; $\Theta F$ represents a parameter of the second generator F; $\Theta D_F$ represents a parameter of the second discriminator $D_F$; $D_F(y)$ represents a third output obtained by the second discriminator $D_F$ on the real abstract image y; $E_y$ represents the average over all real abstract images y; $F(x)$ represents an output of the second generator F for the first shape line image x; $D_F(F(x))$ represents a fourth output obtained by the second discriminator $D_F$ on the generated sample G(x); and $E_x$ represents the average over all first shape line images x.

10. The method according to claim 8, wherein a cycle loss function of the first generator G and the second generator F in step S205 is expressed as follows:

$$L_{cyc}(D,F)=\|F(G(x))-x\|_1+\|G(F(y))-y\|_1,$$

wherein, $L_{cyc}(D,F)$ represents the cycle loss function of the first generator G and the second generator F; F(G(x)) represents the line shape image corresponding to the complete abstract image obtained by the second generator F; x represents the first shape line image in the training dataset A; G(F(y)) represents the second complete abstract image obtained by the first generator G; y represents the real abstract image in the training dataset B.

\* \* \* \* \*